US012579503B2

(12) United States Patent
Akbar et al.

(10) Patent No.: US 12,579,503 B2
(45) Date of Patent: Mar. 17, 2026

(54) NEURAL NETWORKS TO GENERATE RELIABILITY SCORES

(71) Applicant: Amazon Technologies, Inc., Seattle, WA (US)

(72) Inventors: Haroon Ali Akbar, Burlington (CA); Juan Pablo Padilla, Austin, TX (US); Rahul Pruthi, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/608,481

(22) Filed: Mar. 18, 2024

(65) Prior Publication Data

US 2025/0292199 A1 Sep. 18, 2025

(51) Int. Cl.
*G06Q 10/0835* (2023.01)

(52) U.S. Cl.
CPC ................................ *G06Q 10/0835* (2013.01)

(58) Field of Classification Search
None
See application file for complete search history.

(56) References Cited

U.S. PATENT DOCUMENTS

| | | | | |
|---|---|---|---|---|
| 12,263,861 B1 * | 4/2025 | Innocenzi | ............. | B60W 40/09 |
| 2017/0323233 A1 * | 11/2017 | Bencke | .............. | G06Q 10/0633 |
| 2018/0376290 A1 * | 12/2018 | Dhillon | ................. | H04W 4/023 |
| 2019/0138973 A1 * | 5/2019 | Akella | ................... | G06N 3/084 |
| 2022/0092516 A1 * | 3/2022 | Hunter | ............. | G06Q 10/06393 |
| 2023/0267399 A1 * | 8/2023 | Howard | .......... | G06Q 10/06398 |
| | | | | 705/7.42 |

* cited by examiner

*Primary Examiner* — George Chen
(74) *Attorney, Agent, or Firm* — Davis Wright Tremaine LLP

(57) ABSTRACT

Systems and methods are described relating to score generation for an account of a delivery service using one or more neural networks. The one or more neural networks can generate the score using time series data including metrics associated with the account. In response to a time slot being selected by the account from the set of time slots, the score can be used to generate safeguards for the account, where the safeguards are to be applied prior to execution of one or more scheduled deliveries associated with the time slot.

20 Claims, 8 Drawing Sheets

600

RECEIVE ORDERS FOR DELIVERY — 602

GROUP ORDERS INTO TIME SLOTS BASED ON THEIR ROUTES AND TIMETABLES — 604

TRANSMIT A LIST OF OFFERS, WITH EACH OFFER PROVIDING DETAILS ABOUT INDIVIDUAL TIME SLOTS — 606

RECEIVE AN ACCEPTANCE OF AN OFFER FROM A CARRIER'S CLIENT DEVICE — 608

DETERMINE THAT THE CARRIER WHO ACCEPTED THE OFFER HAS ENTERED A GEOFENCED REGION — 610

OBTAIN A SCORE FOR THE CARRIER — 612

DETERMINE SAFEGUARDS FOR THE CARRIER BASED ON THE SCORE — 614

APPLY SAFEGUARDS TO THE CARRIER — 616

DETERMINE WHETHER THE CARRIER COMPLIED WITH THE SAFEGUARDS — 618

COMPLIED? — 620

PREVENT THE CARRIER FROM EXECUTING AT LEAST ONE SCHEDULED DELIVERY IN THE TIME SLOT — 622

ALLOW THE CARRIER TO EXECUTE AT LEAST ONE SCHEDULED DELIVERY IN THE TIME SLOT — 624

700

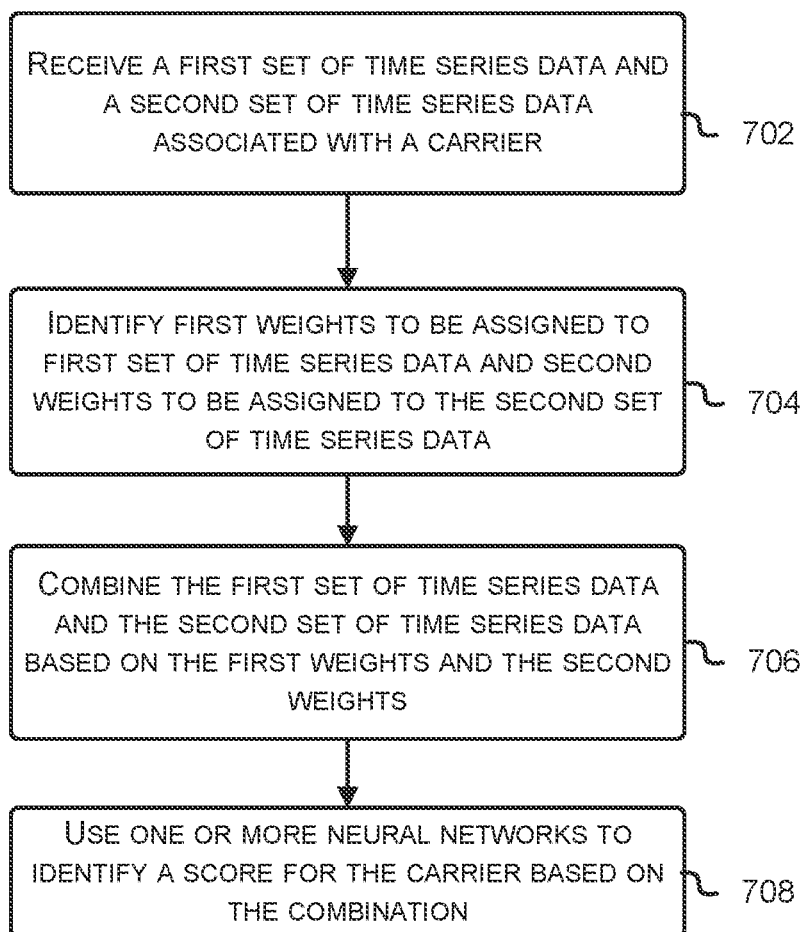

RECEIVE A FIRST SET OF TIME SERIES DATA AND A SECOND SET OF TIME SERIES DATA ASSOCIATED WITH A CARRIER — 702

IDENTIFY FIRST WEIGHTS TO BE ASSIGNED TO FIRST SET OF TIME SERIES DATA AND SECOND WEIGHTS TO BE ASSIGNED TO THE SECOND SET OF TIME SERIES DATA — 704

COMBINE THE FIRST SET OF TIME SERIES DATA AND THE SECOND SET OF TIME SERIES DATA BASED ON THE FIRST WEIGHTS AND THE SECOND WEIGHTS — 706

USE ONE OR MORE NEURAL NETWORKS TO IDENTIFY A SCORE FOR THE CARRIER BASED ON THE COMBINATION — 708

FIG. 7

NEURAL NETWORKS TO GENERATE RELIABILITY SCORES

BACKGROUND

Through a computer network, an application facilitates communication with package carriers tasked with delivering parcels to customers, enabling seamless interaction between carriers and recipients through the application. The system enables the application's provider (e.g., delivery service) to send precise notifications to drivers, detailing their delivery itineraries, destinations, and parcel pickup locations. These notifications provide explicit guidance for carriers on handling deliveries and pickups efficiently and effectively.

However, integrating software and carriers into the network presents challenges. The need for prompt and secure parcel delivery requires comprehensive control measures, including continuous monitoring and specific guidelines for carrier operations. Factors like inclement weather, heavy traffic, and variable carrier dependability can adversely impact parcel delivery, affecting both the network's efficiency and its overall performance. Seasonal or unexpected surges in delivery demand, coupled with fluctuating carrier availability, can also strain the network's operational capacity. This diminished efficiency, in turn, leads to increased consumption of computing resources and latency within the network, further complicating the delivery process.

BRIEF DESCRIPTION OF THE DRAWINGS

Various techniques will be described with reference to the drawings, in which:

FIG. 7 illustrates an example process to use neural networks to generate scores for carriers, in accordance with at least one embodiment.

DETAILED DESCRIPTION

Figure 1:
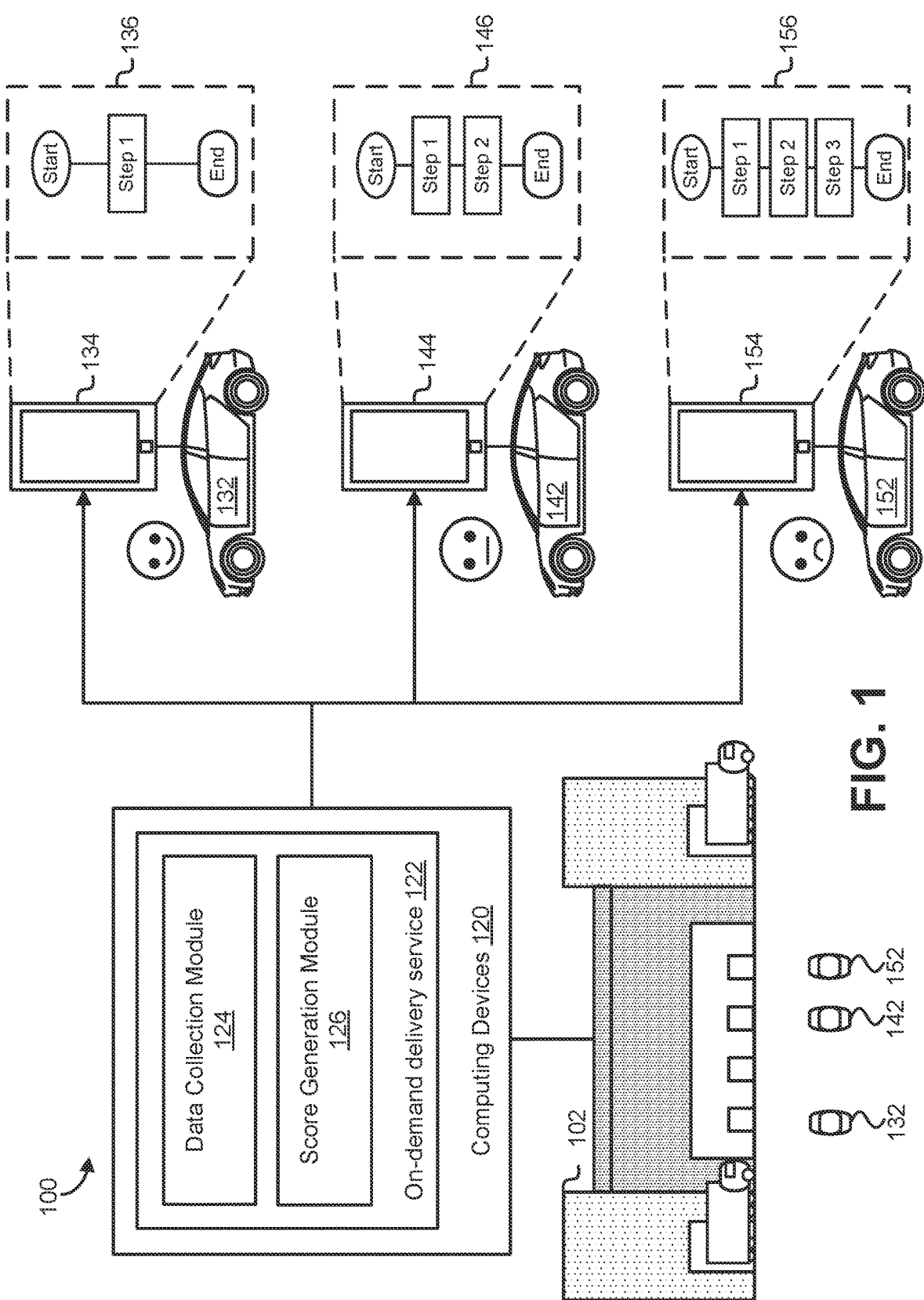
FIG. 1 illustrates a schematic diagram illustrating an example system that generates safeguards for carriers based on their score, in accordance with at least one embodiment.

Systems and methods are described herein for generation of reliability scores of carriers (e.g., freelance drivers, autonomous vehicles) that are part of a delivery service using neural networks. For example, delivery service may include a system that manages a network of independent carriers. A carrier in the context of a delivery service may refer to any individual with access to a vehicle (e.g., car, truck, bus, bicycle) who joins the network to receive offers for deliveries that are scheduled in time slots. A time slot may refer to a designated period during which carriers can register to deliver packages, groceries, or other items ordered via different service providers linked to the delivery service. Reliability score may refer to a quantified metric to assess carriers' consistency and dependability in fulfilling delivery tasks.

The system may include a graphical user interface (GUI) that enables carriers to create a user account for network participation. The system may manage a network of stations (e.g., distribution centers) and coordinate delivery schedules for them. For instance, one station within this network may receive a batch of orders for delivery, and the system may then create delivery routes for these orders. The system may schedule orders within specific time slots, factoring in the delivery routes and estimated delivery durations. Each time slot may encompass a timetable for the delivery routes, detailing both the anticipated start and finish times. The system may create a list of offers where each offer includes detailed information of the time slots. Detailed information may include station address, destination address, anticipated start and finish times, specific instructions for performing the delivery (e.g., be careful to not scare animals or young children, drive below a particular speed limit, use or do not use a front door or different entrance). The list of offers can be transmitted to the carrier's client devices.

In various examples, carriers may transmit, via their respective devices, an indication to accept the offer. After accepting the offer, the carriers may be required to arrive at the designated station at time noted in the offer. When the carriers arrive near the station (e.g., geofenced region), the system may apply safeguards that the carriers need to comply with before executing at least one scheduled delivery in the time slot. One example of a safeguard can be requiring, via a GUI, identity verification (e.g., taking a photo of themselves) from the carrier's device. Alternatively, reliable carriers (e.g., carriers with a high score) may be requested to comply with the carriers as they accept the offer without being physically present near the station. As described, reliable carriers can be required to comply with less stringent safeguards, whereas less reliable carriers can be required to comply with more stringent safeguards.

In some examples, the system may generate scores for the carriers before or after the carrier accepts the offer. To generate the scores, the system may use neural networks that receive a set of time series data associated with metrics of the carriers as inputs. Each of the sets of time series data may include metrics recorded over varying intervals or during distinct data collection periods.

Neural networks used for score generation may include long short-term memory (LSTM) networks, gated recurrent units (GRUs), bidirectional recurrent neural networks (BiRNNs), echo state networks (ESNs), or any other recurrent neural networks (RNN) capable of sequence modeling tasks (e.g., time series data analysis). One example of time series data may include data from the past three weeks on the following metrics: on-time arrival for assigned time slot, no-show rates for these slots, rate of meeting package delivery commitments, and compliance with delivery standards. There can be time series data with different data collection periods (e.g., three weeks, six months). The system can average (e.g., computing rolling average, trailing average) data points within a period such that a single value that represents each metric in a certain time period can be used as inputs to the neural networks.

The system may assign various weights to time series data or computed averages based on the data collection period.

For example, the system may determine that a time series data for a three-week data collection period has more weight assigned than the other time series data for a six-month data collection period because of a policy to give more weight to recent data. In another example, the system can assign less weight during a certain period (e.g., from August to September) due to certain circumstances that are out of carriers' control (e.g., weather conditions such as a sudden storm). Then, the system may combine those with assigned weights such that the combination can be used as inputs to the neural networks. The combined data can be represented as vectors. The neural networks may use the combined data to generate a score that corresponds to the carrier.

The system may train the neural networks using data that indicates a relationship between carrier metrics and their known reliability. For example, the system may receive reviews from customers about the delivery executed by a carrier and compare the review with various metrics associated with the carrier. The review may include written descriptions of the delivery experience along with photographs of the delivered package. In one example, the customers can rate carriers, with the collective ratings forming a basis for neural network training data. Another example includes using historic data which labels those carriers as either reliable or unreliable. Those labels with their associated metrics can be used to train the neural networks.

In various examples, the system may generate safeguards (e.g., guardrails, protocols) for the carriers based on their scores. A safeguard can be proactive, aiming to prevent potential issues with a delivery, hazards before they occur, or reactive, intended to minimize damage after an issue or incident has occurred. For reliable carriers with a high score (e.g., above a threshold), the system may apply less stringent safeguards such that additional computing resources could be allocated for the less reliable carriers with lower scores. For example, the system may allow the carriers to start picking up packages to be delivered as a result of sending a photo of themselves and does not require further steps to complete the check-in process prior to package pickup.

Conversely, for less reliable carriers with a lower score, the system may apply more stringent safeguards to ensure that the ones with a lower score are willing to commit to the time slot they agreed to work on. For example, the safeguards for the less reliable carriers with a low score may include background checks, training, vehicle inspection, ID verification, geofencing, insurance requirements, etc. In either way, the system may display, via GUI, the safeguards applied to the carriers.

Carriers may submit responses, such as a driver's license copy or confirmation of being within a geofenced area, to the system as part of complying with the safeguards established for them. As a result, the system may determine whether carriers complied with their safeguards. For example, the system may use Optical Character Recognition (OCR) technology to scan and extract information from documents such as driver's licenses, vehicle registration, and insurance papers. Additionally, the system may use biometric verification methods such as facial recognition or fingerprint scanning and comparing these data with those on file. For example, a carrier can perform verification by providing a picture of their driver's license and periodically taking a photo of themselves using their phone when delivering items to customers. A system can also verify carriers by other methods such as voice recognition, palm scanning, or other ways of verifying a person's identity (e.g., using a PIN, passwords, security questions, security tokens).

In various examples, if the system verifies the carrier's compliance with the applied safeguards, it can present detailed instructions for scheduled deliveries within the designated time slot through a GUI. For example, the system may provide maps that show the delivery destinations for the carrier, accompanied by recommended routes to follow.

In other examples, the system may periodically or aperiodically modify the score of the carriers using the neural networks if a triggering event has happened. For example, if a carrier fails to adhere to certain standards (e.g., arrive at the station on time, perform deliveries on time), the system receives the information and inputs those information to the neural networks to generate a new score for the carrier. Another example of a triggering event can be receiving negative feedback from customers who received packages from the carrier. Conversely, a triggering event may include a carrier with a lower score consistently executing deliveries in accordance with the established standards. Then the system may generate a higher score for the carrier using one or more neural networks.

In various examples, the system may provide a list of time slots based on reliability scores of carriers. Specifically, for a carrier with a higher reliability score, the system may provide time slots which include scheduled deliveries with more challenging routes. For instance, for carriers who have shown a consistent history of safe driving, the system may offer time slots that involve scheduled deliveries to high-traffic areas, such as downtown regions.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) reduced usage of computing resources (e.g., processing power, memory usage) as a result of applying less stringent safeguards for reliable carriers, (2) accurate identification of reliability among freelance carriers, and (3) simplified user interface as a result of applying less stringent safeguards for reliable carriers.

FIG. 1 illustrates a schematic diagram illustrating an example system 100 that generates safeguards for carriers based on their score, in accordance with at least one embodiment. System 100 may include station 102, computing devices 120, carrier 132, carrier 142, and carrier 152.

In at least one embodiment, computing devices 120, by including hardware and software, facilitate workflow management within on-demand delivery services 122. Terms such as "hardware" described herein may include one or more of central processing units (CPUs), hardwired circuitry, programmable circuitry, state machine circuitry, fixed function circuitry, execution unit circuitry, firmware that stores instructions executed by programmable circuitry, integrated circuit (IC), system on-chip (SoC), graphics processing unit (GPU), data processing unit (DPU), digital signal processor (DSP), tensor processing unit (TPU), accelerated processing unit (APU), application-specific integrated circuits (ASIC), intelligent processing unit (IPU), neural processing unit (NPU), smart network interface controller (SmartNIC), vision processing unit (VPU), field-programmable gate array (FPGA), etc.

In addition, terms such as "software" described herein may include one or more of operating systems, device drivers, application software, database software, graphics software (e.g., Radeon, Intel Graphics), web browsers, development software (e.g., integrated development environments, code editors, compliers, interpreters), network software (e.g., intel PROset, Intel Advanced Network Services), simulation software, real-time operating systems (RTOS), artificial intelligence software (e.g., Scikit-learn, TensorFlow, PyTorch, Accord.NET, Apache Machout), robotics software (Robotics Benchmarks for Learning (ROBEL), MS AirSi, Apollo Baidu, ROSbot 2.0, Poppy Project), firmware (e.g., BIOS/UEFI, router, smartphone, consumer electronics, embedded systems, printer, solid state drive (SSD)), application programming interface (API), containerized software (e.g., Nginx, Apache HTTP Server, MySQL, PostgreSQL, Redis, Memcached, Node.js, Elasticsearch, Gitlab, Jenkins, WordPress), container orchestration platform (e.g., Kubernetes, Docker Swarm, Apache Mesos, Nomad, Microsoft Azure Kubernetes Service, Google Kubernetes Engine, Red Hat OpenShift, Rancher) and any other implementation embodied as a software package, code and/or instruction set. Computing devices 120 are connected to a database (not illustrated in FIG. 1) to store and process various data generated by on-demand delivery service 122.

On-demand delivery service 122 can be a platform that facilitates immediate or scheduled delivery of goods and services to customers upon request. On-demand delivery service 122 may manage multiple stations (e.g., station 102) by allocating orders based on various criteria such as geographic proximity, station capacity, and specialization in certain types of orders. On-demand delivery service 122 may ensure that orders are directed to the most suitable station, facilitating optimal resource utilization and timely order fulfillment. On-demand delivery service 122 may analyze real-time data to predict demand surges, allowing the service to dynamically adjust its operations, such as redistributing resources or prioritizing orders, to maintain efficiency. Moreover, on-demand delivery service 122 may facilitate seamless communication between stations (not illustrated in FIG. 1), delivery personnel, and customers, ensuring transparency and coordination throughout the delivery process.

In at least one embodiment, station 102 can be a physical location or hub where delivery operations are coordinated and changed. Station 102 may include, for example, local distribution center, pick-up point (e.g., warehouse, retail store), vehicle depot, sorting facility, customer service center. Alternatively, station 102 may include locations designated by carriers. For example, carriers (e.g., carriers with high scores) may elect to perform check-in near or at their homes and receive package to be delivered from other carriers of the on-demand delivery service 122.

On-demand delivery service 122 may include data collection module 124 and score generation module 126. Carrier 132, carrier 142, and carrier 152 are participants of a network that on-demand delivery service 122 provides. Carriers may refer to an individual or entity responsible for the transportation and delivery of goods or packages from the point of origin (e.g., station 102) to the destination as requested by the customer. Carriers may include independent contractors, employees of the delivery service, or third-party logistics providers. Carriers may use various modes of transportation, such as bicycles, motorcycles, cars, or vans, depending on the package size, delivery urgency, and geographic considerations. Also, carriers may include autonomous vehicles or robots that are capable of executing scheduled deliveries without direct human control.

To execute one or more deliveries, carriers may have to comply with safeguards, which are further described herein. For example, Carrier 132 may include client device 134 that displays less stringent safeguards 136 due to carrier 132 being associated with an account of on-demand delivery service 122 with a higher score. A reliability score for carriers may refer to a quantified metric to assess carriers' consistency and dependability in fulfilling delivery tasks. For example, a score can be on a scale from 1 to 10, where 1 indicates the least reliable carrier and 10 indicates the most reliable carrier. In another example, the score can be a scale from 1 to 100, where 1 indicates the least reliable carrier and 100 indicates the most reliable carrier. Less stringent safeguards 136 may be displayed as a result of carrier 132 accepting one or more offers to deliver one or more orders listed by on-demand delivery service 122. Also, less stringent safeguards 136 may be displayed without carrier 132 being located in a geofenced region to allow carrier 132 to perform check-in.

Carrier 142 may include client device 144 that displays stringent safeguards 136 due to carrier 142 being associated with an account of on-demand delivery service 122 with a mediocre score. Stringent safeguards 146 may be displayed as a result of carrier 142 accepting one or more offers to deliver one or more orders listed by on-demand delivery service 122. Also, stringent safeguards 146 may be displayed when client device of carrier 144 is located in a geofenced region that allows carrier 142 to perform check-in.

Carrier 152 may include client device 154 that displays less stringent safeguards 156 due to carrier 152 being associated with an account of on-demand delivery service 122 with a higher score. More stringent safeguards 156 may be displayed as a result of carrier 152 accepting one or more offers to deliver one or more orders listed by on-demand delivery service 122. Also, more stringent safeguards 156 may be displayed when carrier 152 is located in a geofenced region that allows carrier 152 to perform check-in. Such client devices (e.g., client device 134, client device 144, client device 154) may include smartphones, tablets, smart watches, laptops, handheld GPS devices, portable scanners, body cameras, vehicle-mounted devices, etc. For autonomous vehicles or robots, such safeguards are to adjust settings of such vehicles such that those can adhere to higher delivery standards.

In at least one embodiment, score generation module 126 may generate scores of such carriers (e.g., carrier 132, carrier 142, carrier 152) of on-demand delivery service 122. Score generation module 126 uses one or more neural networks to generate scores of a carrier based on two or more sets of metrics of the carrier that are stored in a form of time series data or averages derived from data points across various time intervals. Before using the one or more neural networks, score generation module 126 may assign weights to each set of metrics of the carrier based on a policy associated with the on-demand delivery service 122. Score generation module 126 may include score generation module 230 illustrated in FIG. 2. Outputs of score generation module 126 can be used to determine different safeguards (e.g., safeguard 136, safeguard 146, safeguard 156).

Score generation module 126 may periodically (e.g., every week, every month) or aperiodically generate scores for various carriers concurrently or individually without indication of carriers' acceptance of a time slot. For example, score generation module 126 may generate scores while carriers are fulfilling deliveries within their accepted time slots. In another example, score generation module 126 may generate scores (e.g., carrier 132, carrier 142, carrier 152) when a carrier registers in an application hosted by on-demand delivery service. Additionally, score generation module 126 may generate scores based on user input (e.g., intent to get the score updated). For example, score generation module 126 can generate scores for carriers dynamically, e.g., before performing a task, when performing a task, or after performing a task.

In various examples, score generation module 126 may freeze scores of carriers if the carriers are inactive for a certain period of time or receive an indication that the carrier deactivates their account associated with on-demand delivery service 122. Alternatively, score generation module 126 may lower the scores if the carriers are inactive. After the carriers return and become active, on-demand delivery service 122 may provide the scores generated by score generation module 126 such that the carriers are given the opportunity to improve their scores. On-demand delivery service 122 may provide, through its applications, one or more instructions to improve their scores. For example, a carrier may view their score using an application, and also view instructions for how to improve their score (e.g., perform more tasks within a time limit, receive more positive reviews from customers when delivering packages by following instructions).

In at least one embodiment, data collection module 124 can be a module that collects data (e.g., metrics) of carriers (e.g., carrier 132, carrier 142, carrier 152) of on-demand delivery service 122. Data collected from data collection module 124 can be used to generate scores by score generation module 126. Data collection module 124 may include data collection module 210 illustrated in FIG. 2.

In at least one embodiment, in addition to those modules (e.g., data collection module 124 and score generation module 126), on-demand delivery service 122 may perform different functions. For example, on-demand delivery service 122 may manage a network of independent delivery partners by allowing the carriers (e.g., carrier 132, carrier 142, carrier 152) to self-onboard with user accounts and continuously monitor and update metrics for the user accounts. On-demand delivery service 122 may interact with client devices (e.g., client device 134, client device 144, client device 154) and allow the carriers to reserve offers for time slots. On-demand delivery service 122 may allow carriers to provide user input for reservations for offers for blocks, acceptance of offers, confirmation for check-in location, and confirmation for step complete, and may display instructions to receive orders.

On-demand delivery service 122 may, via a graphical user interface (GUI), guide the carriers to perform steps to complete a delivery route. Specifically, on-demand delivery service 122 may display instructions associated with a current delivery step for the carriers to guide the completion of each delivery step. The instructions may include directing the carriers to drive from one location to another. It may further include instructions to drive to a starting location to receive further instructions.

On-demand delivery service 122 may receive shipment data associated with orders and process the orders for station 102. The shipment data may include data for a shipment that may be processed into orders to be delivered from station 102. In some examples, on-demand delivery service 122 may receive and process the shipment data ahead of receiving shipment to schedule offers for time slots. On-demand delivery service 122 may generate optimized routes by grouping orders based on delivery areas. On-demand delivery service 122 may determine an estimated delivery time and limit the optimized routes to a maximum delivery block time. The maximum delivery block time can be any reasonable length of work time (e.g., two hours total, three hours total, etc.). On-demand delivery service 122 may determine a schedule for each delivery route, including an approximate start time and end time, and generate time slots based on the delivery routes. On-demand delivery service 122 may generate time slots with scheduled deliveries to include a starting location (e.g., address for the station 102), an expected start time, an expected total delivery time to complete the time slot, and payment for the time slot. On-demand delivery service 122 may determine the capacity of station 102 and determine to stagger the start time for the blocks to avoid too many carriers arriving at the same time.

In at least one embodiment, on-demand delivery service 122 may provide a list of time slots based on reliability scores of carriers. Specifically, for a carrier with a higher reliability score, the system may provide time slots which include scheduled deliveries with more challenging routes. For instance, for carriers who have shown a consistent history of safe driving, the system may offer time slots that involve scheduled deliveries to high-traffic areas, such as downtown regions. In another example, for carriers who have high scores, on-demand delivery service 122 may offer time slots that involve scheduled deliveries with more expensive items. The opposite may happen (e.g., carriers with low scores get offers for less expensive items). Also, on-demand delivery service 122 may offer time slots that involve different types of items based on score generated by score generation module 126. For example, carriers with higher scores may have an opportunity to accept offers that involve fragile items that need extra care, bulk items, high value items (e.g., expensive), or a combination thereof. For example, a carrier with a high score can receive instructions to deliver, pick up, or otherwise perform a task that has a value of greater than $1,000 (e.g., delivering a TV, picking up a TV, or installing a TV). Furthermore, carriers with high reliability scores can be assigned scheduled deliveries to customers known to have a history of issues as reported by other carriers or personnel within the on-demand delivery service 122. Customized time slots can be part of safeguards described herein.

Figure 2:
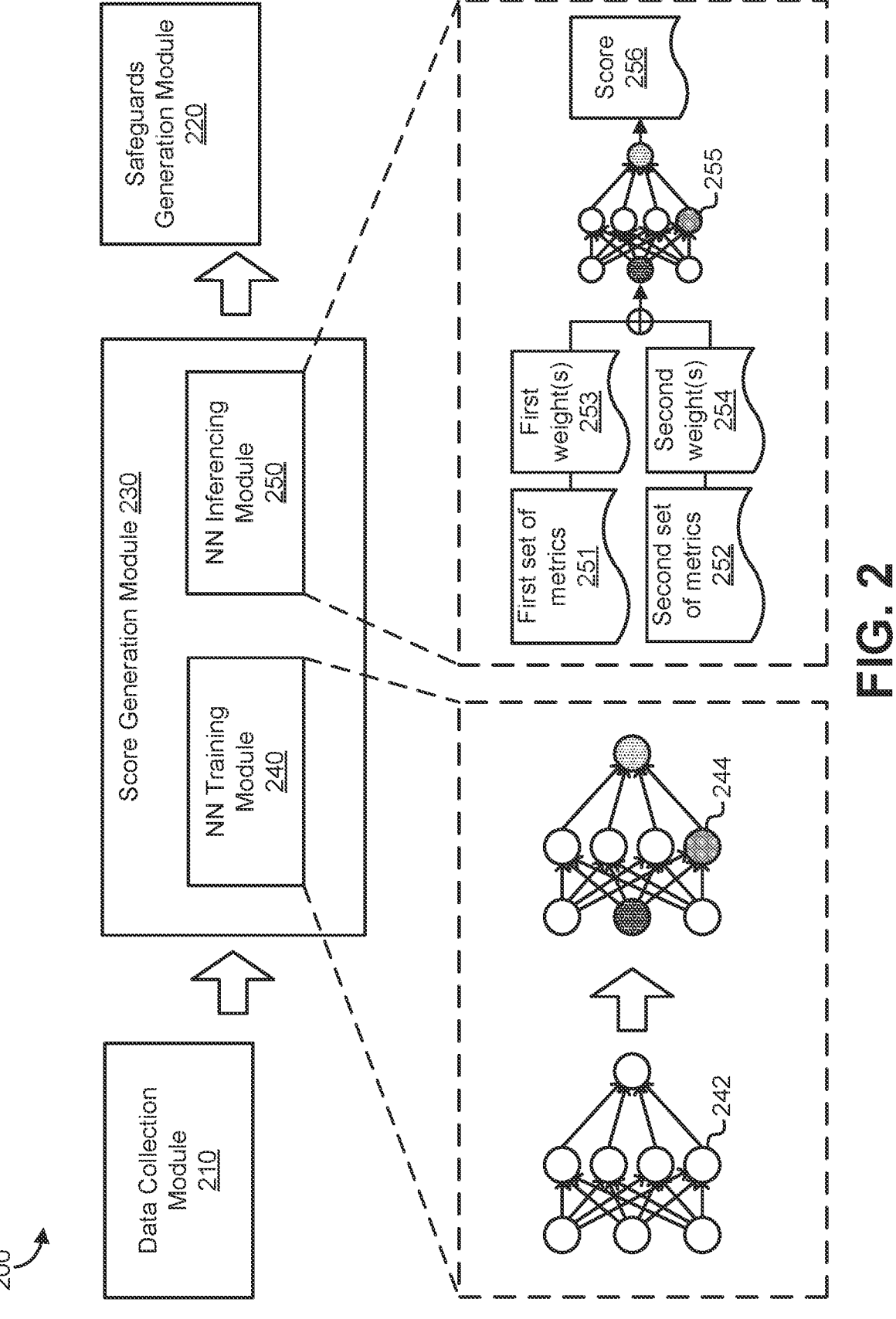
FIG. 2 illustrates a block diagram illustrating an example system that performs neural network training and inferencing to generate scores for carriers, in accordance with at least one embodiment.

FIG. 2 illustrates a block diagram illustrating an example system 200 that performs neural network training and inferencing to generate scores for carriers, in accordance with at least one embodiment. System 200 may include data collection module 210, score generation module 230, and safeguard generation module 220. System 200 may be part of on-demand delivery service 122 illustrated in FIG. 1.

In at least one embodiment, data collection module 210 can be a module that collects data (e.g., metrics) of carriers of an on-demand delivery service. Data collection module 210 may generate and store user account data for carriers in a database. Data collection module 210 may receive data from carriers creating a new user account. Data collection module 210 can be connected with a database to store all kinds of metrics related to carriers. The database may be a local database and/or a networked database to share information across stations. The data received from carriers may include driver license, tax identification code, insurance, financial institute, onboard location, etc.

Data collection module 210 may maintain user account data. The user account data may include driver metrics, delivery records, and delivery metrics further described herein. Data collection module 210 may determine based on the user account data whether a present account should be active, flagged, or offboarded. An offboarded account can be an account that has been removed and/or otherwise has network access privilege revoked from the network of delivery partners (e.g., carriers), usually due to high indication of fraudulent activities (e.g., 100% delivery defects for 10 or more consecutive blocks).

Data collection module 210 may store the account data for at least a predetermined length of time. In some instances, if data collection module 210 determines the driver's license for a carrier has expired, the user account may be flagged until an updated license is uploaded. The driver metrics module 210 may receive and analyze delivery data to update metrics for user accounts mentioned in the delivery data. In some examples, the data collection module 210 may receive and parse delivery data from a database or additional data source (e.g., data from a third-party delivery application) for additional data, including metrics and/or features that may influence a delivery service level of a driver. For instance, the metrics and/or features may include data specific to routes/time slots (e.g., time slot information and a number of orders in the time slot); data specific to a station (e.g., station size and station age); and data specific to the carrier's performance history.

In at least one embodiment, another examples of delivery metrics of carriers include delivery time, on-time delivery rate, score generated from customer feedback, delivery accuracy, number of deliveries completed, time slot forfeit rate, fuel efficiency, check-in time for time slot, incident rate, earnings per day, no-show for assigned time slot, compliance with delivery instructions, and any other adherence for high delivery accuracy. Delivery accuracy may refer to the measure of how precisely the delivery service meets the expected standards of delivering items. This may include several aspects including the condition of items upon arrival, ensuring they are undamaged, verification of delivery through photographic evidence, adherence to the specified delivery window noted in the selected time slot, correct delivery to the intended recipient or location, and the completeness of the order without any missing items. Additionally, delivery accuracy may include the accuracy of real-time tracking updates provided to customers and the effectiveness of communication between the delivery service and the customer throughout the delivery process.

The delivery metrics of carriers can be maintained as time series data, which are documented across various periods and/or at different time intervals. The time series data can be used by score generation module 230 to generate scores for different carriers that are in the network of on-demand delivery service.

Data collection module 210 may collect data and metrics associated with a station. Data collection module 210 may collect data associated with the stations from various sources and retrieve station data as needed by the modules, including data specific to the local station and/or stations in the network, including station information and station-specific training data (e.g., routes data, routes completed, etc.). Data collection module 210 may collect shipment data for incoming shipment for orders and delivery data associated with the routes and orders.

In at least one embodiment, score generation module 230 can be a module that generates scores for carriers of an on-demand delivery service. Score generation module 230 may receive a request to generate a score for a carrier. Alternatively, score generation module 230 may receive a request to generate scores for a plurality of carriers. In response to the request, score generation module 230 may send a request to data collection module 210 to retrieve two or more groups of metrics of the carrier in the form of time series data, recorded at various intervals. Instead, score generation module 230 may receive two or more groups of metrics of the carrier comprising averages calculated from data points spanning different time frames.

In at least one embodiment, score generation module 230 may determine weights to be assigned to each of the two or more groups of metrics to process based on the duration over which the group of metrics was recorded. For example, score generation module 230 may assign greater weights to a group of metrics collected over a six-week period compared to those gathered over five months, adhering to a policy that prioritizes more recent data or vise versa. Additionally, score generation module 230 may assign weights based on circumstances that are out of control. For example, some time periods can be associated with a surge period (e.g., holiday), which makes it harder for carriers to adhere to certain standards. In another example, some time periods can be associated with weather conditions such as heavy rain, fog, hurricane, tornado, heavy snow. Additionally, some time periods can be associated with heavy traffic conditions during rush hours, construction, accident, etc. This contextual information can be utilized to prevent penalizing carriers for incidents that were beyond their control.

After assigning the weights, score generation module 230 may combine the two or more groups of metrics to generate a single input for one or more neural networks, where the single input can be represented as vectors. Then, score generation module 230 may use the one or more neural networks to generate a score for the carrier. In addition, score generation module 230 may determine weights based on a type of metrics. For example, one metric (e.g., no-show rate for check-in) can have more weights assigned compared to another metric (e.g., check-in time).

The one or more neural networks may include LSTM, GRUs, Bi-RNNs, Stacked RNNs, ESNs, ConvLSTM, and any other RNNs. Also, the one or more neural networks may further include transformer neural networks. Score generation module 230 may train the one or more neural networks using one or more of supervised training, unsupervised learning, semi-supervised learning, reinforcement learning, self-supervised learning, transferred learning, etc. Score generation module 230 may determine hyperparameters to train the neural networks. The hyperparameters may include learning rate, batch size, number of epochs, number of layers, number of neurons, activation function, loss function, optimization algorithm, regularization technique, initialization method, momentum, etc. Score generation module 230 may initialize weights of the one or more neural networks by performing one or more of zero or constant initialization, random initialization, Xavier initialization, He initialization, LeCun initialization, orthogonal initialization, sparse initialization, etc.

In various examples, score generation module 230 may use the relationships between various metrics of the carrier and its review from the customers as training data. Customers may provide feedback to carriers of the delivery service through the service's interface (e.g., website, application). After the completion of a delivery, the interface may prompt the customer to rate their experience, often on a scale from one to five stars. In addition to the numerical rating, customers may have the option to leave written comments detailing their delivery experience, noting aspects such as the driver's punctuality, professionalism, and the condition of the delivered package. Customers may select predefined tags or attributes that best describe their experience, such as "friendly," "quick," or "handled with care." Additionally, customers may post images depicting the overall experience (e.g., images of packages delivered).

Returning back to neural network training, the neural network determines whether the output generated by the various metrics of the carrier aligns with how the carrier received review from the customers (e.g., customer leaving review for packages delivered, interaction with the carrier, etc.) as the basis of its loss function. Score generation module 230 may use data from carriers who are known to be reliable or unreliable and compare their respective metrics.

In at least one embodiment, safeguards generation module 220 can be a module that generates safeguards that are to be applied to carriers of an on-demand delivery service. Safeguards generation module 220 may determine different types of safeguards based on score of the carrier.

For example, a carrier with a higher score can be subject to safeguards that are easier to adhere to. Safeguards generation module 220 may determine how many safeguards the carrier needs to comply with based on score of the carrier. For example, a carrier with a higher score can be subject to a single safeguard (e.g., picture of a driver's license). Conversely, a carrier with a lower score can be subject to multiple safeguards (e.g., background checks, geofencing, mandatory training, etc.). Safeguards can include, for example, background checks (e.g., criminal history, previous employment verification, immigration documents), thorough vehicle inspections, mandatory training programs (e.g., safe driving practices, package handling, customer service), higher insurance coverage, enhanced geofencing, strict health and safety standards, etc.

Additionally, safeguards generation module 220 may modify safeguards based on the score of carriers. For example, for a carrier who has increased score, safeguards generation module 220 may modify the safeguards such that the modified safeguards require a smaller number of facial images or require less intensive training (e.g., completing two instead of three courses) prior to executing at least one scheduled delivery. Conversely, for another carrier who has decreased score, safeguards generation module 220 may modify the safeguards such that the modified safeguards require additional number of facial images or require more intensive training prior to executing at least one scheduled delivery.

For autonomous vehicles or robots, safeguards generation module 220 may generate safeguards that include adjusting settings of such vehicles such that those can adhere to higher delivery standards. Also, such safeguards for vehicles or robots may include updating machine learning algorithms (e.g., neural networks) to ensure that they follow the correct route.

In various examples, these protective measures can be provided to carriers in multiple formats to ensure comprehension and adherence. For instance, visual cues such as on-screen alerts or color-coded notifications can inform drivers of specific precautions or actions required. Audio signals, including beeps or spoken instructions, provide an auditory layer of guidance, especially useful in scenarios where visual engagement is limited. Additionally, haptic feedback like vibrations can serve as an immediate and discreet form of alert.

In at least one embodiment, safeguards generation module 220 generates safeguards that guide time slots that can be offered to various carriers. In one example, for carriers who have high scores, safeguards may include offering time slots that involve scheduled deliveries with more expensive items. The opposite may happen (e.g., carriers with low scores get offers for less expensive items). Also, safeguards may include offering time slots that involve different types of items based on score generated by score generation module 126. For example, carriers with higher scores may have an opportunity to accept offers that involve fragile items that need extra care or bulk items.

Other examples of safeguards causing on-demand delivery service 122 to provide personalized time slots may include offering time slots with scheduled deliveries that need to be done at a certain time. Particularly, carriers with a high score may receive an offer to execute scheduled deliveries in rush-hour or non-peak times. Personalized time slots may also include exposure to certain types of customers. Specifically, carriers with a high score may receive an offer to execute scheduled deliveries for customers who have good ratings or otherwise marked as important. Personalized time slots may also include exposure to certain delivery addresses. In at least one embodiment, safeguards may include determining the type of task that a carrier should perform. Tasks can also include other types of tasks such as carrier helping a client with a technical issue (e.g., setting up a Wi-Fi network, setting up a product, performing an in-person instructional meeting for how to use or repair a item). For example, tasks may include performing pick-up from a customer who previously received a package and wants to return the package to a station. Tasks may further include assisting other carriers who had to pause or stop executing their scheduled deliveries. Particularly, carriers with a higher score may receive an offer to rescue the carriers who face difficulties executing their delivery. Additionally, those with higher scores can be offered tasks that involve installing items in customers' homes.

Figure 3:
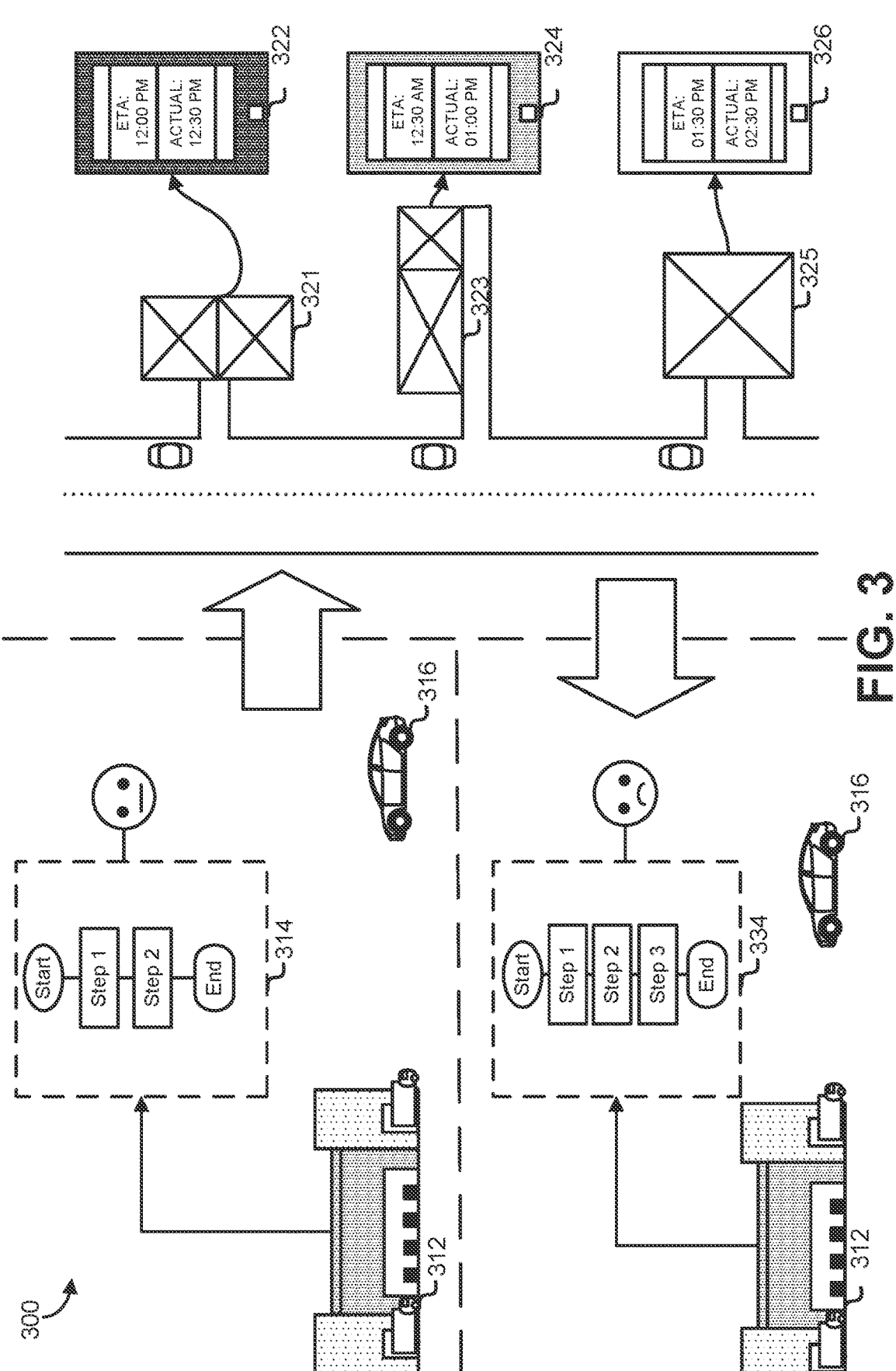
FIG. 3 illustrates an example of a system for generating a low score for a less reliable carrier, in accordance with at least one embodiment.

FIG. 3 illustrates an example of a system 300 for generating a low score for a less reliable carrier, in accordance with at least one embodiment. Example 300 can be scenarios occurring in conjunction with system 100 illustrated in FIG. 1. Example 300 may include station 312, carrier 316, first destination 321, second destination 323, and third destination 325.

In at least one embodiment, carrier 316 with a mediocre score may comply with one or more first safeguards 314 that are based on its score. The one or more first safeguards 314 can be to execute one or more scheduled deliveries within a time slot that carrier 316 selected. Carrier 316 may fail to adhere to all of the guidelines established by the delivery service. For example, carrier 316 may deliver package in a time (e.g., 12:30 PM) after agreed-upon delivery schedule (e.g., 12:00 PM) in first destination 321 as shown in screen 322. Additionally, carrier 316 may deliver package in a time (e.g., 01:00 PM) after agreed-upon delivery schedule (e.g., 12:30 PM) in second destination 323 as shown in screen 324. Carrier 316 may deliver package in a time (e.g., 02:30 PM) after agreed-upon delivery schedule (e.g., 01:30 PM) in third destination 325 as shown in screen 326.

As a result of not adhering to all of the agreed-upon delivery schedules, the delivery service may update the metrics and use those updated metrics to one or more neural networks to update the score for carrier 316. The one or more neural networks may generate a lower score for carrier 316. The lower score may cause the delivery service to apply one or more second safeguards 334 to execute one or more scheduled deliveries within another time slot that carrier 316 selected. The one or more second safeguards 334 can be more stringent compared to one or more first safeguards 414. For example, the one or more second safeguards 434 may include enhanced background checks (e.g., criminal history, previous employment verification), thorough vehicle inspections, mandatory training programs (e.g., safe driving practices, package handling, customer service), higher insurance coverage, enhanced geofencing, strict health and safety standards, etc.

Figure 4:
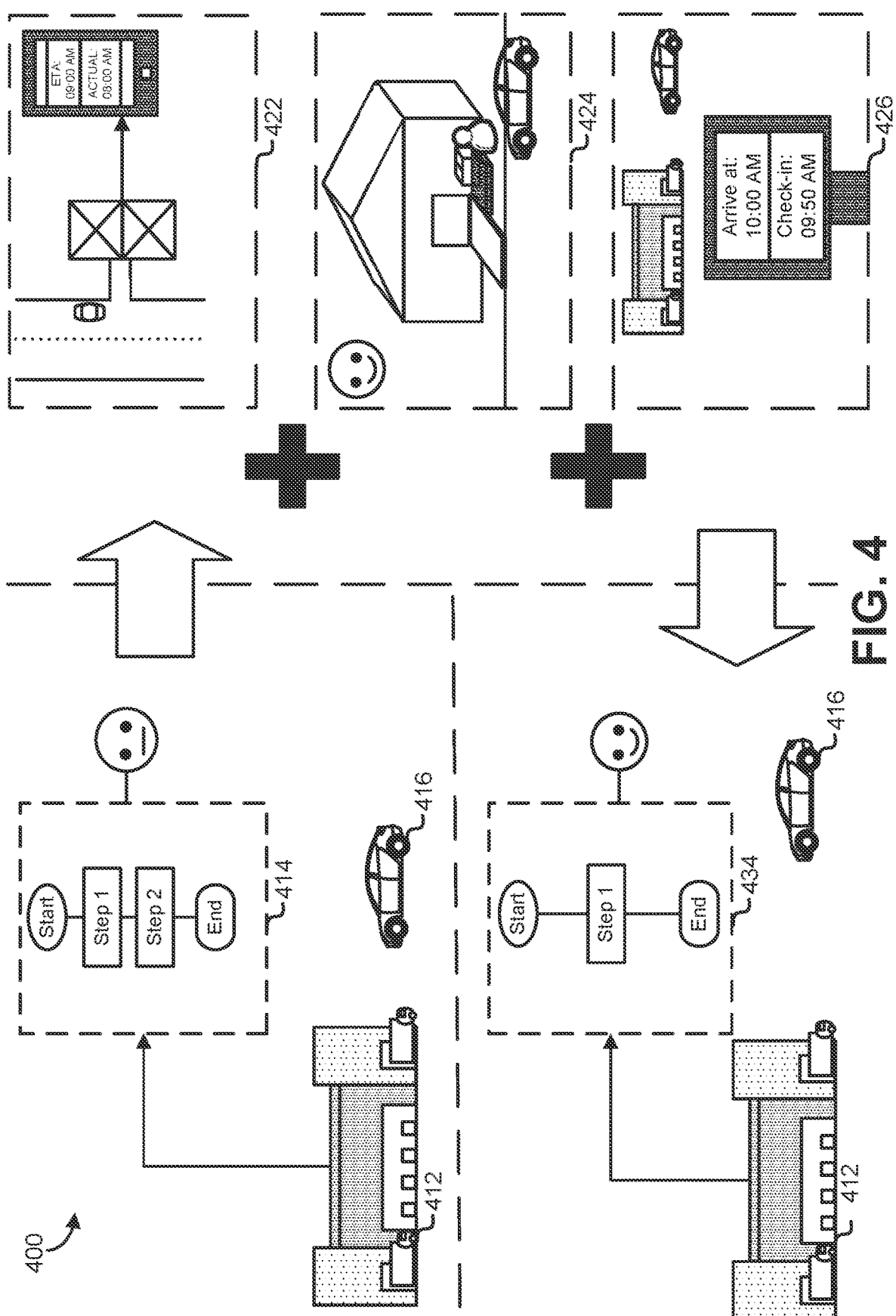
FIG. 4 illustrates an example of a system for generating a high score for a reliable carrier, in accordance with at least one embodiment.

FIG. 4 illustrates an example of a system 400 for generating a high score for a reliable carrier, in accordance with at least one embodiment. Example 400 can be scenarios occurring in conjunction with system 100 illustrated in FIG. 1. Example 400 may include station 412, carrier 416, first event 422, second event 424, and third event 426.

In at least one embodiment, carrier 416 with a mediocre score may comply with one or more first safeguards 414 that are based on its score. The one or more first safeguards 414 can be to execute one or more scheduled deliveries within a time slot that carrier 416 selected. Carrier 416 may adhere to the guidelines established by the delivery service. For example, in first event 422, carrier 416 may ensure package delivery on or prior to the agreed-upon delivery schedule. Additionally, in second event 424, carrier 416 may place the package in a specific location as per the customer's instructions in the order. In third event 426, carrier 416 may check in at or before the stipulated check-in time set by the delivery service.

As a result of adherence to the guidelines, the delivery service may update the metrics and use those updated metrics to one or more neural networks to update the score for carrier 416. The one or more neural networks may generate a higher score for carrier 416. The higher score may make the delivery service apply one or more second safeguards 434 to execute one or more scheduled deliveries within another time slot that carrier 416 selected. The one or more second safeguards 434 can be less stringent compared to one or more first safeguards 414. For example, the one or more second safeguards 434 may require showing a facial image of carrier 416.

Figure 5:
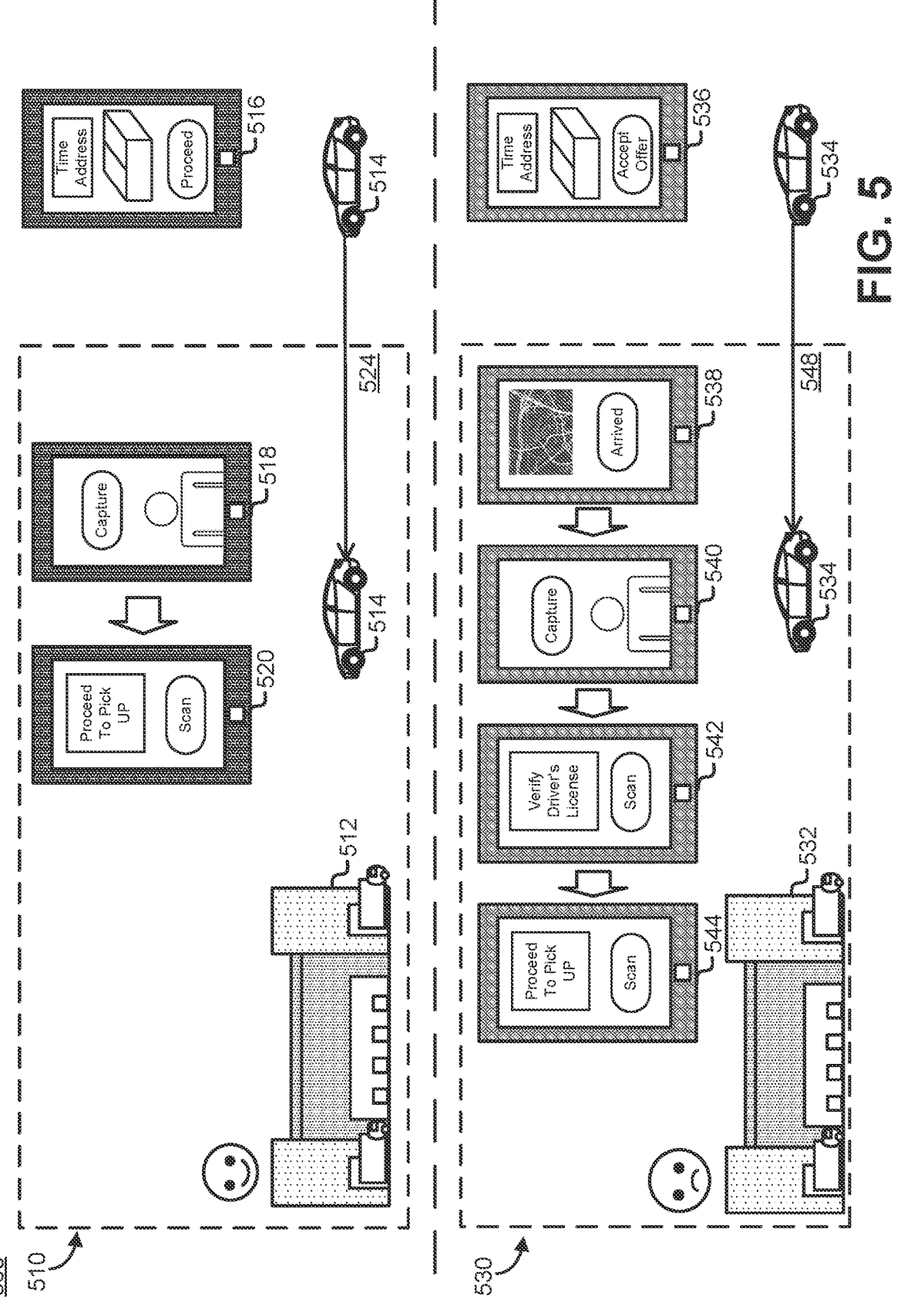
FIG. 5 illustrates an example of a system for applying safeguards based on the score of a carrier, in accordance with at least one embodiment.

FIG. 5 illustrates an example of a system 500 for applying safeguards based on score of a carrier, in accordance with at least one embodiment. Example 500 can be scenarios occurred in conjunction with system 100 illustrated in FIG. 1. Example 500 may include scenario 510 and scenario 530. Each scenario may illustrate the application of safeguards in response to the carriers' scores.

In at least one embodiment, in scenario 510, there can be station 512, carrier 514, and geofenced region 524. Carrier 514 may accept an offer to execute at least one delivery in a time slot as displayed in screen 516. After accepting the offer, carrier 514 may enter a geofenced region 524 to perform check-in to execute at least one delivery. A geofenced region (e.g., geofenced region 524, geofenced region 548) can be a virtual boundary defined by GPS or RFID technology, marking a specific geographic area. For example, when a carrier (e.g., carrier 514, carrier 534) enters or exits this boundary, the geofencing system can trigger an action (e.g., apply safeguards). Geofenced region 524 includes station 512. Delivery service (such as one illustrated in FIG. 1) may determine that carrier 514 has a high score and apply less stringent safeguards to carrier 514. For instance, carrier 514 may only have to send a picture of themselves as displayed in screen 518. After the delivery service determines that the picture is an accurate depiction of carrier 514, the delivery service may guide carrier 514 to the next steps, such as directing them to screen 520 for package pickup procedures.

In at least one embodiment, in scenario 530, there can be station 532, carrier 534 and geofenced region 548. Station 532 may be the same or different compared to station 512. Carrier 534 may be the same or different compared to carrier 514. Geofenced region 548 can be the same or different compared to geofenced region 548. Carrier 534 may accept one of offers to execute at least one delivery in a time slot as displayed in screen 536. After accepting an offer, carrier 534 may enter a geofenced region 548 to perform check-in to execute at least one delivery. Geofenced region 548 may include station 532.

The delivery service may determine that carrier 534 has a low score and apply more stringent safeguards to carrier 534. For instance, carrier 534 may have to perform multiple steps to comply with the more stringent safeguards. First step can be confirming that carrier 534 arrived at the geofenced region 548 as displayed in screen 538. Second step can be sending a picture of themselves as displayed in screen 540. Third step can be verifying ID of carrier 534 such as by sending a copy of their driver's license as displayed in screen 542. The steps may be in different orders. After the delivery service determines that the responses sent by carrier 534 are accurate, the delivery service may guide carrier 534 to the next steps, such as directing them to screen 544 for package pickup procedures.

Figure 6:
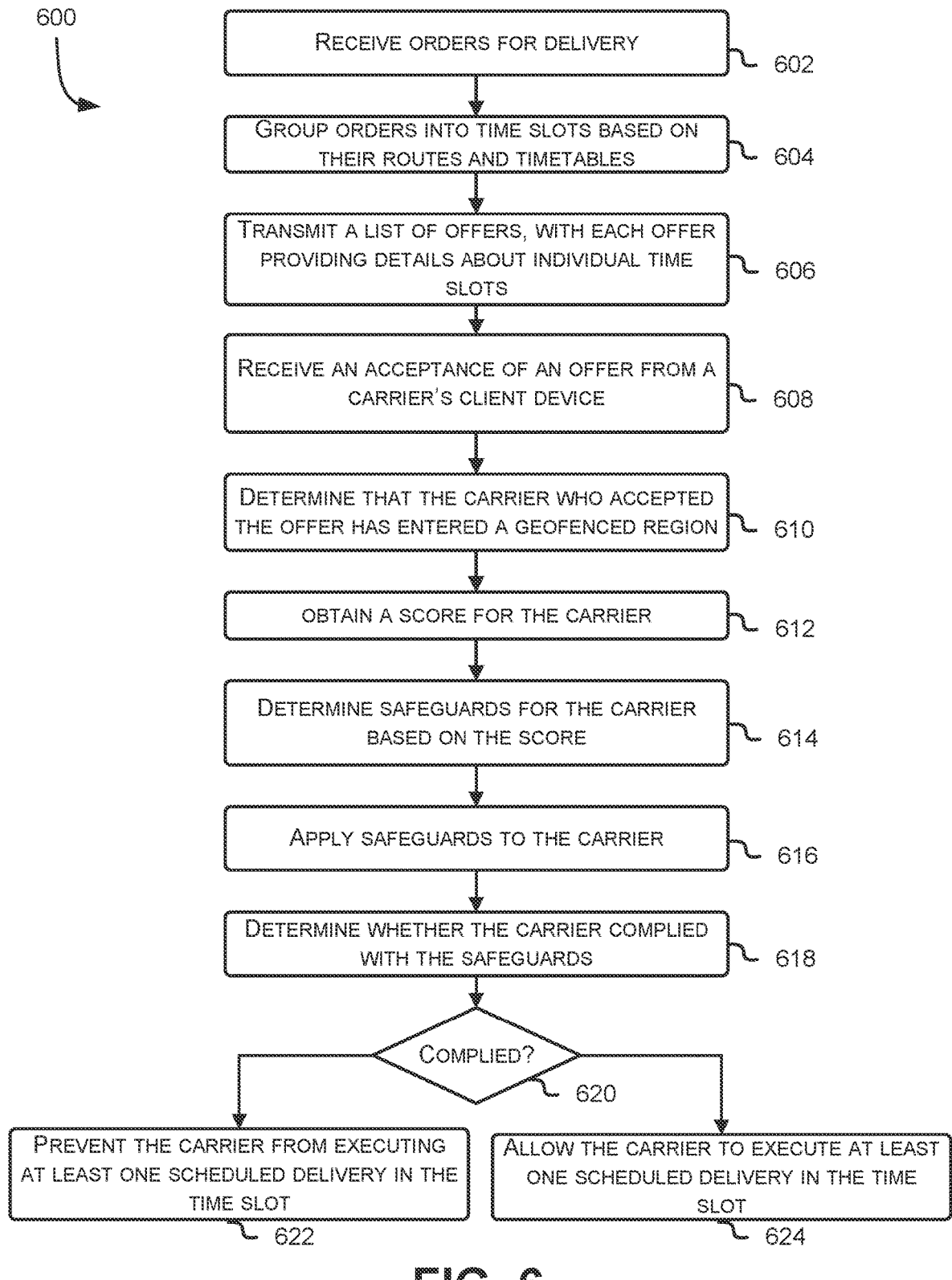
FIG. 6 illustrates an example process to generate safeguards for carriers based on their score, in accordance with at least one embodiment.

FIG. 6 illustrates an example process 600 to generate safeguards for carriers based on their score, in accordance with at least one embodiment. Although process 600 is depicted as a series of steps or operations, it will be appreciated that at least one embodiment of process 600 includes altered or reordered steps or operations, or omits certain steps or operations, except where explicitly noted or logically required, such as when an output of one step or operation is used as input for another. One or more entities described in conjunction with FIGS. 1-5, singly or in any combination, may perform each block of process 600. For example, the one or more entities may include at least one component of system 100, system 200, example 300, example 400 and/or example 500. For example, the one or more entities may include a delivery service. The one or more entities may further include, for example, one or more of hardware, firmware, and/or software described in conjunction with FIG. 1.

Various functions can be carried out by a processor executing instructions stored in memory (e.g., computer readable, machine readable) to perform process 600. Also, process 600 may also be implemented as computer-usable instructions (e.g., macro instruction, micro-instruction) stored on computer storage media or provided by a stand-alone application, a service or hosted service (standalone or in combination with another hosted service).

At block 602, the one or more entities may receive orders for delivery. The one or more entities may handle shipment data related to the orders, processing them for one or more stations under their management. This shipment data may include information about shipments that have arrived at a station and are ready to be processed for delivery from that station.

At block 604, the one or more entities may group orders into time slots based on their routes and timetables. Prior to grouping the orders, the one or more entities may determine routes by analyzing real-time traffic conditions, delivery priorities, and the locations of pickups and drop-offs. The one or more entities may use machine learning algorithms (e.g., neural networks) to calculate the most efficient routes, considering factors like distance, time, and operational constraints to ensure timely deliveries. The one or more entities may analyze destinations, timetables, and route efficiency to ensure that each time slot maximizes the number of deliveries while adhering to time constraints. Timetable may refer to planned departure and arrival times for carriers at various locations.

At block 606, the one or more entities may transmit a list of offers to carriers, with each offer providing details about individual time slots. The one or more entities may further determine eligible carriers to receive the offer for the one or more work blocks. Eligible carriers may refer to carriers that are associated with a score over a threshold (e.g., 70). Also, eligible carriers may refer to carriers that are located within a certain radius of the stations associated with the list of offers. The one or more entities may provide, via a GUI, a list of offers to client devices of the carriers.

In various examples, the one or more entities may transmit personalized list of offers that depend on scores of the carriers. For example, carriers with higher score can be offered with scheduled deliveries in a certain time period that others are prevented to perform or offered with scheduled deliveries at a certain location. In another example, carriers with higher scores can be offered with time slots that are associated with a particular type of item (e.g., expensive item) that needs to be delivered or associated with a particular type of customer (e.g., ones with higher ratings).

At block 608, the one or more entities may receive an acceptance of an offer from a carrier's client device. The carrier may indicate the offer from the list provided to the client device. The carrier may accept multiple offers that correspond to various time slots. The one or more entities may verify that the carrier has not accepted overlapping time slots. In case of any scheduling conflicts, the one or more entities may engage with the carrier to address the issue, which may involve choosing one time slot and retracting acceptance of the conflicting one.

At block 610, the one or more entities may determine that the carrier who accepted the offer has entered a geofenced region. For example, the carrier's device, equipped with GPS, may send its location data to the one or more entities. When this data indicates the device has crossed into the predefined geographical boundary of the geofenced area, the one or more entity may recognize the carrier's entry into that region. This may rely on real-time location updates from the carrier's GPS-enabled device.

At block 612, the one or more entities may obtain a score for the carrier. The one or more entities may use one or more neural networks (e.g., LSTM, GRU, or any other RNN) that receive two or more sets of metrics in time series data or single data point (e.g., average of data points over a specified period), where the two or more sets of metrics are associated with the carrier who accepted the offer. Each of the two or more metric sets can be recorded at varying data collection periods. The varying data collection periods may allow the one or more entities to assign different weights to each of the two or more metric sets before they are combined as a single input for the one or more neural networks. Instead of generating the score using neural networks, the one or more entities may receive the score, which is stored alongside other data related to the carrier.

At block 614, the one or more entities may determine one or more safeguards for the carrier based on the score. In one example, a carrier with a higher score may have to comply with less stringent safeguards. In another example, a carrier with a lower score may have to comply with more stringent safeguards. The one or more safeguards may include background checks, vehicle inspections, training programs (e.g., safe driving practices, customer service, emergency protocols), health and safety guidelines, insurance requirements, real-time tracking, geofencing, ID verification (e.g., driver's license, facial image of the carrier), etc.

At block 616, the one or more entities may apply, via GUI, one or more safeguards to the carrier based on the score. For example, the one or more entities may send notifications to client devices of carriers. In response, the one or more entities may receive one or more responses as a result of applying the one or more safeguards. At block 618, the one or more entities may determine whether the carrier complied with the one or more safeguards. The one or more entities may receive one or more responses from the carriers and determine whether the one or more response match one or more criteria associated with the one or more safeguards. For example, the one or more entities may determine that the copy of the driver's license is valid. In another example, the one or more entities may determine that the carrier is located in the geofenced region when the carrier performs check-in to execute scheduled deliveries in the time slot.

At block 620, if the carrier compiled with the one or more safeguards, process 600 may move to block 622. Verification of such compliance may include using OCR technology to scan and extract information from documents such as driver's licenses, vehicle registration, and insurance papers. The verification may further include biometric verification methods such as facial recognition or fingerprint scanning by comparing these biometric data points with those on file. Also, the verification may include real-time photo verification using machine learning algorithms to confirm identity and vehicle condition. The one or more entities may check that deliveries are made within designated time frames and at the correct locations, using GPS data from the carrier's client device.

In at least one embodiment, if the carrier did not comply with the one or more safeguards, process 600 may move to block 624. At block 622, the one or more entities may prevent the carrier from executing at least one scheduled delivery in the time slot. Alternatively, the one or more entities may provide additional time such that the carrier can comply with the one or more safeguards. In either way, if the carrier fails to comply, the one or more entities may send information of this non-compliance to the one or more safeguards to a database associated with the delivery service such that the information can be used to determine a new score for the carrier using one or more neural networks.

In at least one embodiment, a new score may cause the one or more entities to impose more stringent safeguards to the carrier. For example, the safeguards may include the submission of extra facial photographs, for example, images captured from multiple angles. In another example, the safeguards may include the requirement to undergo extensive training before undertaking scheduled deliveries in expanded time slots.

At block 624, the one or more entities may allow the carrier to execute at least one scheduled delivery in the time slot. The one or more entities may include one or more GUI that displays instructions to execute the work block. The instructions may include information on how to retrieve packages assigned to their time slot. For example, the information may include ways to scan each package as they load it in their vehicle to ensure all items are accounted for and properly tracked. The instructions may further include a route plan including the order of deliveries and navigation assistance for optimized delivery. The route plan can be updated in real time based on traffic conditions and other factors. The instructions may further include a brief overview of safety protocols, delivery procedures, and any specific instructions relevant to their time slot. Additionally, the compliance with the one or more safeguards can be used to generate a new score for the carrier using the one or more neural networks.

FIG. 7 illustrates an example process 700 to use neural networks to generate scores for carriers, in accordance with at least one embodiment. Although process 700 is depicted as a series of steps or operations, it will be appreciated that at least one embodiment of process 700 includes altered or reordered steps or operations, or omits certain steps or operations, except where explicitly noted or logically required, such as when an output of one step or operation is used as input for another. One or more entities described in conjunction with FIGS. 1-5, singly or in any combination, may perform each block of process 700. For example, the one or more entities may include at least one component of system 100, system 200, example 300, example 400 and/or example 500. For example, the one or more entities may include a delivery service. The one or more entities may further include, for example, one or more of hardware, firmware, and/or software described in conjunction with FIG. 1.

Various functions can be carried out by a processor executing instructions stored in memory (e.g., computer readable, machine readable) to perform process 700. Also, process 700 may also be implemented as computer-usable instructions (e.g., macro instruction, micro-instruction) stored on computer storage media or provided by a stand-alone application, a service or hosted service (standalone or in combination with another hosted service). In at least one embodiment, process 700 is part of block 612 of process 600 illustrated in FIG. 6.

At block 702, the one or more entities may receive a first set of time series data and a second set of time series data associated with a carrier, where the first set of time series data and second set of time series data includes metrics that are recorded during distinct data collection periods. The first time series data set is recorded with daily intervals across three days, whereas the second set is captured at weekly intervals over a span of six weeks. In at least one embodiment, the one or more entities determine an average (e.g., three-day average, six-week average) for each time series data to obtain a single point for each metric associated with a first set of time series data and a second set of time series data.

At block 704, the one or more entities may identify first weights to be assigned to the first set of time series data and second weights to be assigned to the second set of time series data. The first weights and the second weights can be determined based on the length of the data collection period. The one or more entities may have a policy to prefer the most recent data and assign more data with the most recent data (e.g., fist set of time series data with daily intervals). Additionally, the one or more entities may identify those weights based on type of a metric (e.g., check-in no-show rate vs. check-in time).

At block 706, the one or more entities may combine the first set of time series data and the second set of time series data based on the first weights and the second weights. The one or more entities may alternatively combine the averages computed in block 704 with the weights.

At block 708, the one or more entities may use the one or more neural networks to identify a score for the carrier based on the combination. The one or more entities may train the one or more neural networks using data that indicates a relationship between carrier metrics and their known reliability. For example, the one or more entities may receive review from customers about the delivery executed by a carrier and compare the review with various metrics associated with the carrier. Another example includes using historic data which labels those carriers as either reliable or unreliable. Those labels with their associated metrics can be used to train the one or more neural networks. The one or more neural networks can be trained by using supervised training, semi-supervised training, unsupervised training, federated learning, etc.

Figure 8:
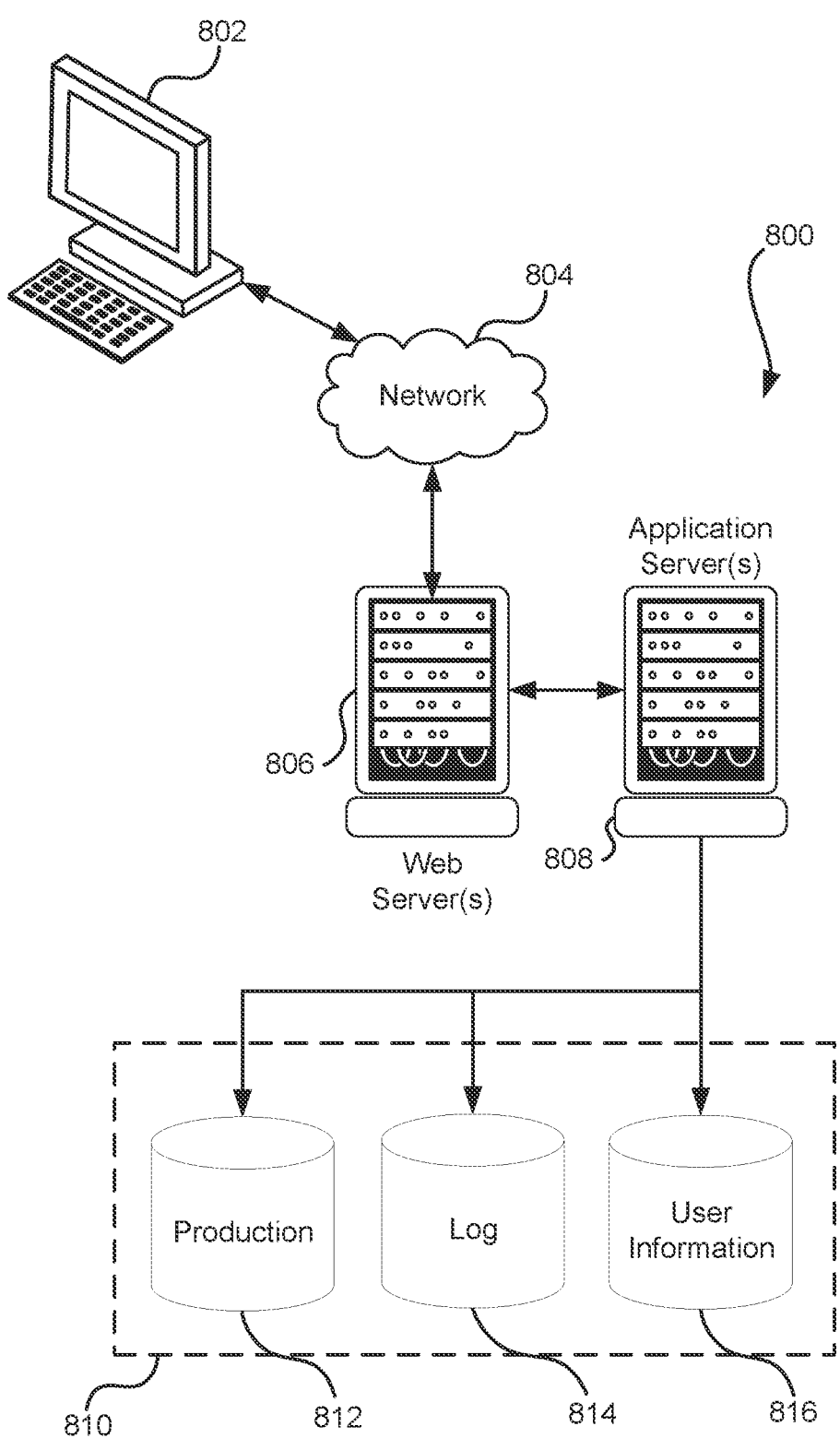
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The system can be used to implement different systems illustrated in FIGS. 1-2. The system can be used to perform one or more blocks of processes illustrated in FIGS. 6-7. At least one embodiment of the disclosure can be described in view of the following clauses:

1. A computer-implemented method, comprising: generating a plurality of time slots that correspond to one or more scheduled deliveries from a station; providing, via a graphical user interface (GUI), a list of the plurality of time slots on a client device associated with a carrier of a delivery service; receiving, from the client device, a selection of a time slot of the plurality of time slots; determining that the client device is located in a geographical region that includes the station; obtaining a first set of time series data and a second set of time series data, wherein the first set of time series data and the second set of time series data comprise metrics of the carrier recorded in a plurality of periods; identifying a first weight for the first set of time series data and a second weight for the second set of time series data; generating, using one or more neural networks, a score of the carrier based, at least in part, on the first weight, the first set of time series data, the second weight, and the second set of time series data; generating, one or more safeguards based, at least in part, on the score; and causing the client device to indicate the one or more safeguards that are applied to the carrier.

2. The computer-implemented method of clause 1, further comprising: obtaining, from the client device, identification information that comprises driver license information, wherein the identification information is associated at least one of the one or more safeguards.

3. The computer-implemented method of clause 1 or 2, further comprising: receiving one or more responses from the client device in response to applying the one or more safeguards; and providing, via the graphical user interface (GUI), instructions for the carrier on the client device to execute the one or more scheduled deliveries in the time slot.

4. The computer-implemented method of any of clauses 1-3, wherein the metrics of the carrier comprises delivery accuracy or check-in time.

5. A system, comprising: one or more processors; memory that stores computer-executable instructions that, if executed, cause the one or more processors to: generate a set of time slots that comprises scheduled deliveries; cause a client device associated with an account of a service to provide an interface that indicates the set of time slots; receive, from the client device, a selection of a time slot of the set of time slots; obtain a first set of time series data and a second set of time series data that comprise a set of metrics of the account recorded in a plurality of periods; identify one or more weights to be assigned to the first set of time series data and the second set of time series data; generate, using one or more neural networks, a score associated with the account based, at least in part, on the first set of time series data and the second set of time series data assigned with the one or more weights; and generate one or more safeguards to be applied to the account prior to executing at least one scheduled delivery in the time slot based, at least in part, on the score associated with the account.

6. The system of clause 5, wherein the computer-executable instructions further comprises computer-executable instructions that, if executed by the one or more processors, cause the system to receive, from the client device, identification data in response to applying the one or more safeguards to the account.

7. The system of clause 5 or 6 wherein the computer-executable instructions further comprises computer-executable instructions that, if executed by the one or more processors, cause the system to provide, via a graphical user interface (GUI), instructions to execute at least one scheduled delivery in the time slot as a result of one or more verified responses received from the client device.

8. The system of any one of clauses 5-7, wherein the computer-executable instructions further comprises computer-executable instructions that, if executed by the one or more processors, cause the system to modify, using the one or more neural networks, the score based, at least in part, on receiving an indication that at least one scheduled delivery of the time slot was uncompleted.

9. The system of any one of clauses 5-8, the computer-executable instructions further comprises computer-executable instructions that, if executed by the one or more processors, cause the system to determine that the client device is located in a geofence region that comprises the location.

10. The system of any one of clauses 5-9, wherein the set of metrics comprise delivery accuracy or check-in time.

11. The system of any one of clauses 5-10, wherein the one or more neural networks are updated based, at least in part, on data received from a service that receives feedback from one or more customers associated with at least the set of time slots.

12. The system of any one of clauses 5-11, wherein the one or more neural networks comprises a recurrent neural network (RNN).

13. A non-transitory computer-readable storage medium storing thereon executable instructions that, as a result of being executed by one or more processors of a computer system, cause the computer system to at least: receive, from a service, first information of a set of time slots that correspond to a set of scheduled deliveries from a location, wherein the first information is associated with an account; indicate the set of time slots on a screen based, at least in part, on the information; transmit, to the service, a selection of a time slot of the set of time slots; and receive second information of a set of protocols to be applied to the account prior to executing one or more scheduled deliveries of the time slot, wherein: the set of protocols are generated based, at least in part, on a score that is associated with the account; the score is generated using one or more neural networks that receive two or more sets of data that are associated with the account; and the two or more sets of data are modified based, at least in part, on a set of weights.

14. The non-transitory computer-readable storage medium of clause 13, wherein the data comprises metrics measured in a plurality of periods.

15. The non-transitory computer-readable storage medium of clause 13 or 14, wherein the instructions further comprise instructions that, as a result of being executed by the one or more processors, cause the computer system to transmit, to the service, one or more responses generated as a result of complying with the set of protocols.

16. The non-transitory computer-readable storage medium of any one of clauses 13-15, wherein the instructions further comprise instructions that, as a result of being executed by the one or more processors, cause the computer system to display, via a graphical user interface (GUI), instructions to execute one or more scheduled deliveries of the time slot based, at least in part, on receiving an indication that the account complied with the set of protocols.

17. The non-transitory computer-readable storage medium of any one of clauses 13-16, wherein one or more weights are assigned to the two or more sets of time series data.

18. The non-transitory computer-readable storage medium of any one of clauses 13-17, wherein the set of metrics comprise check-in time or delivery accuracy.

19. The non-transitory computer-readable storage medium of any one of clauses 13-18, wherein the instructions further comprise instructions that, as a result of being executed by the one or more processors, cause the computer system to indicate, to the service, that the computer system is within a geofenced region that comprises the location.

20. The non-transitory computer-readable storage medium of any one of clauses 13-19, wherein the one or more neural networks comprise a long short-term memory (LSTM) network.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:

generating a plurality of time slots that correspond to one or more scheduled deliveries from a station;

causing a client device associated with a carrier of a delivery service to indicate the plurality of time slots;

receiving, from the client device, a selection of a time slot of the plurality of time slots;

determining that the client device is located in a geographical region that includes the station;

obtaining a first set of time series data and a second set of time series data, wherein the first set of time series data and the second set of time series data comprise metrics of the carrier recorded in a plurality of periods;

identifying a first weight for the first set of time series data and a second weight for the second set of time series data;

generating, using one or more neural networks, a score of the carrier based, at least in part, on the first weight, the first set of time series data, the second weight, and the second set of time series data;

identifying one or more safeguards to be applied to the selected time slot based, at least in part, on the score of the carrier, wherein the identification of the one or more safeguards is dependent on the score of the carrier such that a higher score results in one or more fewer safeguards being applied to the carrier, the one or more fewer safeguards corresponding to fewer communications to the carrier to execute a scheduled task corresponding to the selected time slot; and controlling access to information from the client device to execute the scheduled delivery corresponding to the selected time slot based, at least in part, on compliance with the one or more safeguards.

2. The computer-implemented method of claim 1, further comprising:

obtaining, from the client device, identification information that comprises driver license information, wherein the identification information is associated with at least one of the one or more safeguards.

3. The computer-implemented method of claim 1, further comprising:

determining that one or more responses from the client device comply with the one or more safeguards; and causing the client device to indicate instructions for the carrier to execute the scheduled delivery corresponding to the selected time slot.

4. The computer-implemented method of claim 1, wherein the metrics of the carrier comprise delivery accuracy or check-in time.

5. A system, comprising:

one or more processors; and memory that stores computer-executable instructions that, if executed, cause the one or more processors to:

generate a set of time slots that comprises scheduled deliveries;

cause a client device associated with an account of a service to provide an interface that indicates the set of time slots;

receive, from the client device, a selection of a time slot of the set of time slots;

obtain a first set of time series data and a second set of time series data that comprise a set of metrics of the account recorded in a plurality of periods;

identify one or more weights to be assigned to the first set of time series data and the second set of time series data;

generate, using one or more neural networks, a score associated with the account based, at least in part, on the first set of time series data and the second set of time series data assigned with the one or more weights;

identify one or more safeguards to be applied to the selected time slot prior to executing at least one scheduled delivery in the selected time slot based, at least in part, on the score associated with the account such that a higher score results in one or more fewer safeguards being applied to account, the one or more fewer safeguards corresponding to fewer communications to the client device to execute one or more scheduled tasks in the selected time slot; and control access to information from the client device based, at least in part, on compliance with the one or more safeguards, wherein the information is to enable one or more operations to execute the at least one scheduled delivery at the selected time slot.

6. The system of claim 5, wherein the computer-executable instructions further comprise computer-executable instructions that, if executed by the one or more processors, cause the system to receive, from the client device, identification data in response to applying the one or more safeguards to the account.

7. The system of claim 5, wherein the computer-executable instructions further comprise computer-executable instructions that, if executed by the one or more processors, cause the system to cause the client device to provide instructions to execute the at least one scheduled delivery in the time slot as a result of one or more verified responses received from the client device.

8. The system of claim 5, wherein the computer-executable instructions further comprise computer-executable instructions that, if executed by the one or more processors, cause the system to modify, using the one or more neural networks, the score based, at least in part, on receiving an indication that the at least one scheduled delivery of the time slot was uncompleted.

9. The system of claim 5, the computer-executable instructions further comprise computer-executable instructions that, if executed by the one or more processors, cause the system to determine that the client device is located in a geofence region that comprises the location.

10. The system of claim 5, wherein the set of metrics comprises delivery accuracy or check-in time.

11. The system of claim 5, wherein the one or more neural networks are updated based, at least in part, on data received from a service that receives feedback from one or more customers associated with at least the set of time slots.

12. The system of claim 5, wherein the one or more neural networks comprise a recurrent neural network (RNN).

13. A non-transitory computer-readable storage medium storing thereon executable instructions that, as a result of being executed by one or more processors of a computer system, cause the computer system to at least:

receive, from a service, first information of a set of time slots that corresponds to a set of scheduled deliveries from a location, wherein the first information is associated with an account;

indicate the set of time slots on a screen based, at least in part, on the information;

transmit, to the service, a selection of a time slot of the set of time slots; and receive second information of a set of protocols to be applied to the account prior to executing one or more scheduled deliveries of the time slot, wherein:

the set of protocols to be applied to the selected time slot are selected based, at least in part, on a score that is associated with the account such that a higher score results in fewer communications to the account to execute one or more tasks of the one or more scheduled deliveries corresponding to the selected time slot, wherein compliance with the set of protocols causes access to information from the account to execute a scheduled delivery corresponding to the selected time slot to be controlled;

the score is generated using one or more neural networks that receive two or more sets of data that are associated with the account; and the two or more sets of data are modified based, at least in part, on a set of weights.

14. The non-transitory computer-readable storage medium of claim 13, wherein the data comprises metrics measured in a plurality of periods.

15. The non-transitory computer-readable storage medium of claim 13, wherein the instructions further comprise instructions that, as a result of being executed by the one or more processors, cause the computer system to transmit, to the service, one or more responses generated as a result of complying with the set of protocols.

16. The non-transitory computer-readable storage medium of claim 13, wherein the instructions further comprise instructions that, as a result of being executed by the one or more processors, cause the computer system to display, via a graphical user interface (GUI), instructions to execute one or more scheduled deliveries of the time slot based, at least in part, on receiving an indication that the account complied with the set of protocols.

17. The non-transitory computer-readable storage medium of claim 13, wherein one or more weights are assigned to the two or more sets of time series data.

18. The non-transitory computer-readable storage medium of claim 13, wherein the set of metrics comprise check-in time or delivery accuracy.

19. The non-transitory computer-readable storage medium of claim 13, wherein the instructions further comprise instructions that, as a result of being executed by the one or more processors, cause the computer system to indicate, to the service, that the computer system is within a geofenced region that comprises the location.

20. The non-transitory computer-readable storage medium of claim 13, wherein the one or more neural networks comprise a long short-term memory (LSTM) network.

\* \* \* \* \*